(12) United States Patent
Cardona et al.

(10) Patent No.: US 9,911,042 B1
(45) Date of Patent: Mar. 6, 2018

(54) REAL PROPERTY IMAGE ANALYSIS SYSTEM TO IDENTIFY SIMILAR PROPERTIES

(71) Applicant: STATE FARM MUTUAL AUTOMOBILE INSURANCE COMPANY, Bloomington, IL (US)

(72) Inventors: Alexander Cardona, Bloomington, IL (US); Erin A. Olander, Bloomington, IL (US); John A. Schirano, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/201,030

(22) Filed: Jul. 1, 2016

(51) Int. Cl.
*G06K 9/62* (2006.01)
*G06K 9/00* (2006.01)
*G06T 7/60* (2017.01)
*G06Q 50/16* (2012.01)
*G06F 17/30* (2006.01)

(52) U.S. Cl.
CPC ... *G06K 9/00671* (2013.01); *G06F 17/30867* (2013.01); *G06K 9/6215* (2013.01); *G06Q 50/16* (2013.01); *G06T 7/60* (2013.01); *G06T 2200/24* (2013.01); *G06T 2207/30184* (2013.01)

(58) Field of Classification Search
CPC ........... G06Q 30/0276; G06Q 30/0643; G06Q 50/16; G06Q 30/0625; G06T 2207/30184; G06T 7/0008; G06K 2209/21; G06K 9/00637; G06K 9/00671
See application file for complete search history.

(56) References Cited

U.S. PATENT DOCUMENTS

2016/0092959 A1* 3/2016 Gross ................. G06K 9/00671
705/26.62

* cited by examiner

*Primary Examiner* — Tom Y Lu
(74) *Attorney, Agent, or Firm* — Marshall, Gerstein & Borun LLP; Randall G. Rueth

(57) ABSTRACT

Systems and methods for analyzing image data depicting properties are disclosed According to certain aspects, an electronic device may analyze image data depicting a property to identify a set of attributes of the property. The electronic device may identify, based on the set of attributes, an architectural style of the property. Further, the electronic device may identify at least one additional property having the same architectural style. Data indicative of the at least one additional property may be presented to a user for viewing and assessment.

17 Claims, 7 Drawing Sheets

REAL PROPERTY IMAGE ANALYSIS SYSTEM TO IDENTIFY SIMILAR PROPERTIES

FIELD

The present disclosure is directed to analyzing image data depicting properties. More particularly, the present disclosure is directed to systems and methods for analyzing image data to identify attributes of properties depicted therein, and identifying similar properties based on the attributes.

BACKGROUND

Individuals frequently browse or search for properties for sale or for rent, such as when looking to purchase (or rent) or sell a property, when gauging market conditions, or for other reasons. Technology and connected devices have made property searches easier and more efficient. In particular, certain mobile applications enable users to locate nearby properties for sale and view listing images associated with the properties, among other information.

Certain applications and platforms also enable users to configure filters in searching for properties. For example, users may specify number of bedrooms, number of bathrooms, price range, square footage, year built, lot size, garage information, and/or other filters. While these filters may help users locate properties that conform to desired metrics, the filters do not account for particular styles or appearances of properties. Additionally, the applications do not utilize image data to determine property attributes and identify similar properties.

Accordingly, there is an opportunity for systems and methods to analyze image data depicting properties to identify properties having a similar style or general appearance.

SUMMARY

According to embodiments, a computer-implemented method in an electronic device of analyzing image data to identify similar properties is provided. The method may include capturing, by an image sensor, image data depicting a property, analyzing, by a processor, the image data to identify an architectural style of the property depicted in the image data, identifying at least one additional property having the architectural style of the property depicted in the image data, and presenting, in a user interface, an indication of the at least one additional property.

According to other embodiments, an electronic device configured to analyze image data to identify similar properties is provided. The electronic device may include an image sensor configured to capture image data, a user interface, a memory configured to store non-transitory computer executable instructions, and a processor configured to interface with the image sensor, the user interface, and the memory. The processor may be configured to execute the non-transitory computer executable instructions to cause the processor to access the image data from the image sensor, the image data depicting a property, analyze the image data to identify an architectural style of the property depicted in the image data, identify at least one additional property having the architectural style of the property depicted in the image data, and cause the user interface to present an indication of the at least one additional property.

In a further embodiment, a computer-implemented method of analyzing image data to identify similar properties is provided. The method may include receiving, from an electronic device via a wireless network connection, image data depicting a property, analyzing, by a processor, the image data to identify an architectural style of the property depicted in the image data, identifying at least one additional property having the architectural style of the property depicted in the image data, and sending, to the electronic device via the wireless network connection, data indicative of the at least one additional property, wherein the electronic device presents an indication of the at least one additional property.

DETAILED DESCRIPTION

Figure 1:
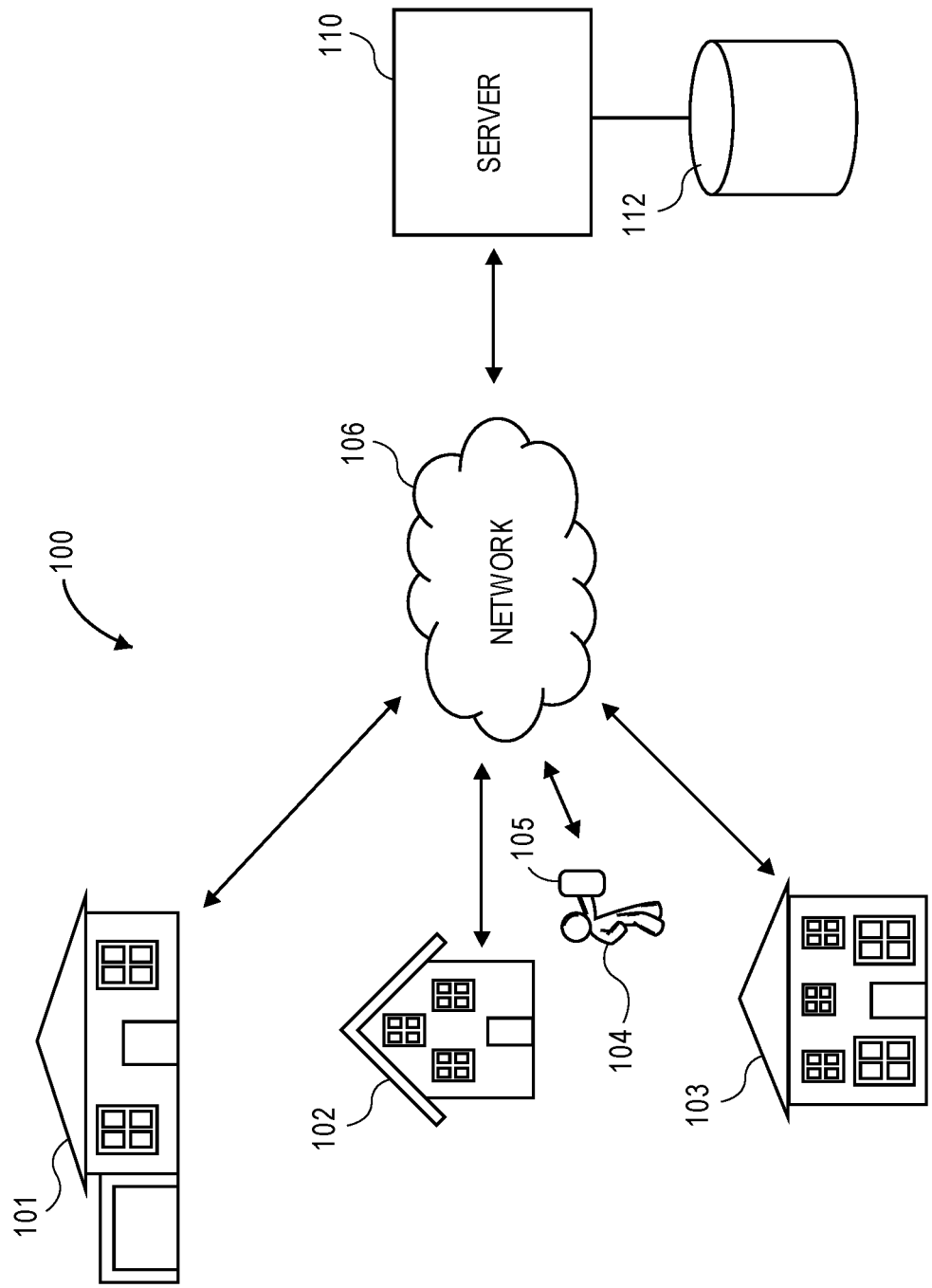
FIG. 1 depicts an overview of an exemplary system of components configured to facilitate various functionalities, in accordance with some embodiments.

The present embodiments may relate to, inter alia, capturing image data depicting properties, analyzing the image data to identify attributes of the properties, and identifying additional properties having the attributes. According to certain aspects, the attributes may be indicative of the architectural styles of the properties. Currently, certain applications enable users to select filters when browsing available properties. However, these applications do not incorporate any type of image analysis for determining similar properties. As a result, it is harder for users to locate or identify properties having a similar aesthetic or appearance to that of a target property.

According to the present embodiments, systems and methods may utilize image processing techniques to analyze image data depicting a property and identify an architectural style of the property depicted in the image data. After identifying the architectural style, the systems and methods may identify additional properties having the architectural style, and may cause indications of the additional properties to be presented to a user.

The systems and methods therefore offer numerous benefits. In particular, the systems and methods dynamically and automatically identify properties that share the same architectural style, which enables users to efficiently and effectively view properties of interest that the user may not otherwise know existed. Additionally, the systems and methods enable more views of properties available for purchase or rent, which potentially increases the value of the properties. Further, the systems and methods may identify properties for individuals in neighborhoods or towns that the individuals were not originally considering. It should be appreciated that other benefits are envisioned.

The systems and methods discussed herein address a business challenge, namely a business challenge related to improving how individuals browse for and view available properties. In conventional applications, individuals may select one or more specified filters to potentially narrow a property search. In contrast, the systems and methods utilize multiple electronic devices connected via one or more wireless connections to analyze image data depicting a property and dynamically identify additional properties that are similar to the property.

Therefore, the systems and methods do not merely recite the performance of some business practice known from the pre-Internet world (browsing available properties) along with the requirement to perform it on the Internet. Instead, the systems and methods are necessarily rooted in computer technology in order to overcome a problem specifically arising in computer networks.

Further, it should be appreciated that the systems and methods may include specialized (i.e., non-generic) or dedicated components capable of performing specialized (i.e., non-generic) or dedicated computer functions. In particular, the systems and methods employ various device sensors (e.g., image sensors) that are specifically configured to collect certain data (e.g., image data). Further, electronic devices interface with the specialized sensors to collect the data and analyze the data.

According to implementations, the systems and methods may support a dynamic, real-time or near-real-time collection, analysis, and communication of any data that may be associated with the assessments and analyses. In particular, the systems and methods may dynamically and automatically collect image data from image sensors in real-time or near-real-time, may automatically and dynamically analyze the collected data, and may automatically and dynamically identify similar properties.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts a set of properties 101, 102, 103. Although FIG. 1 depicts three (3) properties, it should be appreciated that fewer or additional properties are envisioned. Generally, each of the properties 101, 102, 103 may be a dwelling in which individuals may reside, such as a home or an apartment. However, it should be appreciated that the properties 101, 102, 103 may extend to other types of properties such as office buildings, farms, and/or other types of properties or buildings.

According to embodiments, each of the properties 101, 102, 103 may have an architectural style that may be assigned thereto, either automatically or manually. In particular, the architectures styles may include, but are not limited to, the following: contemporary/modern, A-frame, shed-style, colonial, Cape Cod, Dutch colonial, federal, Georgian, European, chateau, country, tudor, cottage, chalet, new American, southwestern, mission, Spanish, adobe, neoclassical, Italianate, plantation, Greek revival, ranch, split-level, Victorian, gothic revival, Queen Anne, second empire, shingle, Mediterranean, Mediterranean modern, farmhouse, log house, low country, cabin, craftsman, bungalow, prairie-style, and traditional. In some situations, a property may have a combination of multiple architectural styles, in which case the property may have a primary or main architectural style. For example, a property may be have attributes consistent with both a Cape Cod and a Dutch colonial, but may have a larger presence of attributes consistent with a Cape Cod, in which case its primary architectural style is Cape Cod.

FIG. 1 illustrates a user 104 or individual having or interacting with an electronic device 105. The user 104 may be any individual or person who may view any of the properties 101, 102, 103. For example, the user 104 may be a person who is interested in purchasing or renting the property 102, which may be available for purchase or rent. The electronic device 105 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic device 105 may be configured to communicate with a server 110 via one or more networks 106. In embodiments, the network(s) 106 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server 110 may be configured to interface with or support a memory or storage 112 capable of storing various data. In embodiments, the storage 112 may store information related to the properties 101, 102, 103, and in particular may store an indication of the architectural style of the properties 101, 102, 103.

According to embodiments, the user 104 may use the electronic device 105 to capture image data that may depict one of the properties 101, 102, 103 (e.g., the property 102). In particular, an image sensor or similar component of the electronic device 105 may capture the image data. The electronic device 105 may transmit the captured image data to the server 110 via the network(s) 106, and the server 110 may analyze the image data to identify or determine an architectural style of the property 102, based on certain attributes of the property 102 depicted in the image data.

After identifying the architectural style of the property 102, the server 110 may identify additional properties that may have the same architectural style as that of the property 102. For example, if the server 110 determines that the property 102 is a ranch, then the server 110 may identify additional ranch properties. In identifying the additional properties, the server 110 may access and examine data stored in the storage 112. The server 110 may transmit data indicative of the additional properties to the electronic device 105 via the network(s), and the electronic device 105 may present indications of the additional properties to the user 104, for example via a user interface.

It should be appreciated that the electronic device 105 may perform and facilitate various of the image processing and additional property identification functionalities, in addition or as an alternative to the server 110 performing and facilitating the functionalities. In particular, the electronic device 105 may perform any or all of analyzing the captured image data, identifying the architectural style of the property depicted in the image data, and identifying additional properties having the same architectural style.

Figure 2:
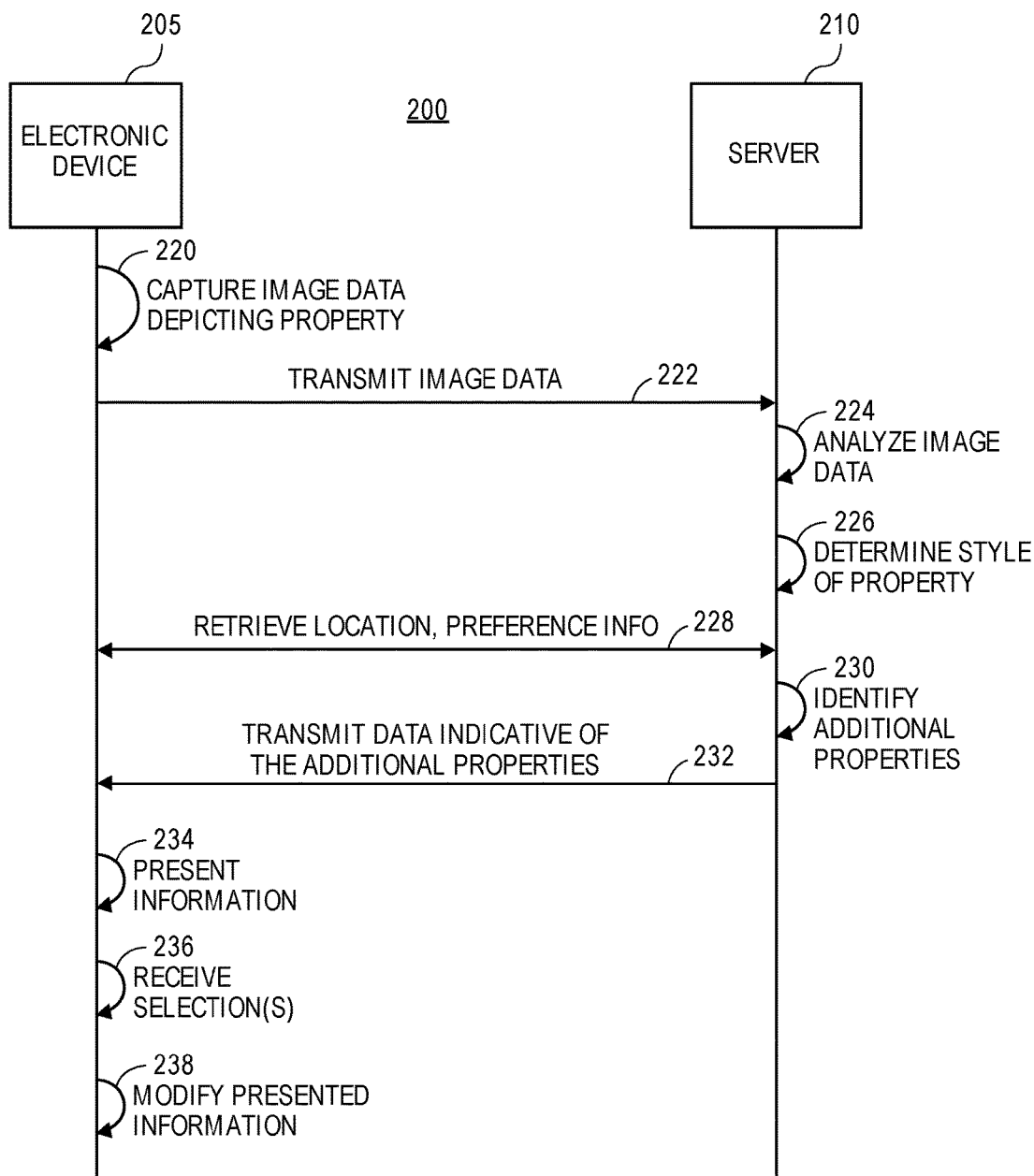
FIG. 2 depicts an exemplary signal diagram associated capturing images of properties, analyzing the images, and identifying similar properties, in accordance with some embodiments.

FIG. 2 depicts a signal diagram 200 associated with certain functionalities related to capturing images of properties, analyzing the images, and identifying similar properties. The signal diagram 200 includes various components including: an electronic device 205 (such as the electronic device 105 as discussed with respect to FIG. 1) and a server 210 (such as the server 105 as discussed with respect to FIG. 1). It should be appreciated that the electronic device 205 may support and execute an application configured to facilitate the communications and functionalities as described herein.

The signal diagram 200 may begin when the electronic device 205 captures (220) image data that may depict a property. The image data may generally be digital image data and may be in the form of one or more digital images that may be captured by an image sensor of the electronic device 205. In embodiments, the image data may depict any portion(s) of an exterior and/or interior of the property. For example, the image data may depict any exterior side or angle of the property, the roof of the property, any interior rooms of the property, any auxiliary buildings of the property (e.g., a shed or a garage), and/or any other portion that may be visible and capable of being captured in image data.

In an implementation, an application of the electronic device 205 may guide a user to capture specific views and/or portions of the property. For example, the application may instruct the user to capture a front view, multiple side views, and a back view of the property. Further, a user interface of the electronic device 205 may display, as a "live view," the captured image data to enable the user to view and assess the captured image data.

The electronic device 205 may transmit (222) the image data to the server 210 via one of a variety of wireless network connections. In an implementation, the electronic device 205 may automatically transmit the image data to the server 210 in response to capturing the image data. In another implementation, a user of the electronic device 205 may select to transmit the image data to the server 210. For example, after the electronic device 205 captures a set of images depicting a property, the user may select to transmit the set of images to the server 210.

Generally, a property may have an associated set of attributes related to an appearance of the property. For example, the set of attributes may include characteristics related to windows (e.g., type, shape, size, and amount of windows), a roof (e.g., size, pitch, material(s)), a presence of one or more dormers, an amount of floors in the property, a general shape of the property, a presence of one or more columns, a presence of one or more turrets, a presence of one or more balconies, an amount of buildings that make up the property, a building material of the property and portions thereof, doorway characteristics, and/or other attributes.

The set of attributes may in combination be indicative of a possible or probable architectural style of the property. In particular, certain architectural styles may have a presence or absence of certain of the set of attributes. For example, ranch-style homes are noted for their long, close-to-the ground profile (i.e., typically a single floor), and minimal use of exterior and interior decoration. For further example, Cape Cod homes typically have a low, broad, frame building, are generally a story and a half high, with a moderately steep, pitched roof with end gables, and a chimney. As an additional example, Tudor homes typically include steeply pitched roofs, decorative half timbering, and embellished doorways.

The server 210 may include storage or memory configured to store indications of the architectural styles as well as which attributes are associated with which architectural styles. After receiving the image data from the electronic device 205, the server 210 may analyze (224) the image data. In particular, the server 210 may analyze the image data to identify any attributes of the property that may be depicted in the image data. For example, the server 210 may identify a pitch of a roof, an amount of windows, a shape of a front doorway, and a number of floors.

It should be appreciated that the server 210 may employ various image processing techniques, algorithms, calculations, or the like in analyzing the image data. For example, the server 210 may employ pixelation, linear filtering, image editing, image restoration, principal components analysis, independent component analysis, hidden Markov models, anisotropic diffusion, partial differential equations, self-organizing maps, neural networks, wavelets, and/or others.

In analyzing the image data, the server 210 may determine (226) or identify an architectural style of the property depicted in the image data, in particular based on the set of attributes of the property identified in the image data. In embodiments, the server 210 may compare the set of attributes of the property identified in the image data to architectural style data stored by the server 210 to calculate a set of similarity metrics, where the set of similarity metrics may indicate which of the architectural styles is most indicated by the set of attributes identified in the image data.

As an example scenario, assume that a similarity metric for a property may range from 0 (i.e., least similar) to 100 (i.e., most similar). The server 210 may calculate one similarity metric for each of the stored architectural styles, based on the set of attributes identified in the image data. In this example, the highest calculated similarity metric may be a 98 for the Spanish architectural style (i.e., the set of attributes of the property may include curves and arches, a white stucco exterior, painted tile, and terracotta roof tiles). The server 210 may further determine that the remaining similarity metrics for the remaining architectural styles are less than 98. Accordingly, the server 210 may deem that the property depicted in the image data has a Spanish architectural style.

It should be appreciated that the server 210 may use other types of metrics or scores in identifying architectural styles. In particular, an architectural style may have a corresponding baseline score that may be representative of a typical property having that particular architectural style, where the baseline score is derived from a presence or absence of certain attributes. Accordingly, the server 210 may determine the architectural style of a given property by calculating a metric for the given property based on identified attributes, and determining which baseline score (and corresponding architectural style) the calculated metric is closest.

In embodiments, the server 210 may retrieve (228) a location of the electronic device 205 and/or preference information of the user of the electronic device 205. A location module (e.g., a GPS module) of the electronic device 205 may identify the location, which may correspond to the location of the property depicted in the image data, and send the location to the server 210. The preference information of the user may include one or more property preferences of the user. For example, the preference information may include property preferences such as one or more of: price, number of bedrooms, number of bathrooms, square footage, open house information, distance to schools, property type (e.g., house, condo, townhouse), HOA fees, year built, lot size, garage information, parking information, days for sale, recent price changes, and/or other information.

In an implementation, the server 210 may request the location and/or the preference information at any point. In another implementation, the electronic device 205 may send the location and the preference information to the server 210 without a request from the server 210 (e.g., the electronic device 205 may send the information in concurrence with sending the image data). In a further implementation, the image data itself may include at least the location(s) corresponding to where the image data was captured.

The server 210 may identify (230) additional properties that have the same architectural style as that of the property identified in (226). According to embodiments, the server 210 may identify the additional properties using the data stored therein (e.g., may identify any additional properties having an existing architectural style designation that matches the architectural style of the property). Further, in embodiments, the server 210 may identify the additional properties from a set of properties that are available for rent or for sale.

In one implementation, the server 210 may identify the additional properties without accounting for the location of the electronic device 205 or the preference information of the user. In this regard, the server 210 may identify properties (or neighborhoods or cities) that the user of the electronic device 205 may not be considering or may not otherwise align with the user's preferences. In another implementation, the server 210 may account for the location and/or the preference information when identifying the additional properties. Accordingly, the additional properties may be located near the property depicted in the image data and/or may match the preferences specified by the user.

The server may transmit (232), to the electronic device 205, data indicative of the additional properties. In particular, the data indicative of the additional properties may include a set of images and/or other information of the properties, including price, number of bedrooms, number of bathrooms, square footage, open house information, distance to schools, property type (e.g., house, condo, townhouse), HOA fees, year built, lot size, garage information, parking information, days for sale, recent price changes, and/or other information.

The electronic device 205 may present (234) any information associated with the additional properties, such as via a user interface. Accordingly, the user of the electronic device 205 may view the information to assess the additional properties. In embodiments, the electronic device 205 may receive (236) a selection from the user, where the selection may be associated with the information presented in the user interface. For example, the user may select a particular one of the additional properties. In response to receiving the selection, the electronic device 205 may modify (238) the presented information accordingly. For example, the electronic device may display various information associated with a selected one of the additional properties.

Although FIG. 2 depicts each of the electronic device 205 and the server 210 performing specific functionalities and analyses, it should be appreciated that either of the electronic device 205 or the server 210 may perform certain of the functionalities and analyses. For example, even though FIG. 2 depicts the server 210 as analyzing the image data, determining the style of the property, and identifying additional properties, it should be appreciated that the electronic device 205 may additionally or alternatively perform these functionalities, where the electronic device 205 may request and/or retrieve information or data from the server 210.

FIGS. 3A-3D illustrate exemplary interfaces associated with identifying properties having the same architectural styles. One or more electronic devices (e.g., a mobile device, such as a smartphone) may be configured to display the interfaces and/or receive selections and inputs via the interfaces. For example, a dedicated application that is configured to operate on the electronic device may display the interfaces. It should be appreciated that the interfaces are merely exemplary and that alternative or additional content is envisioned.

Figure 3B:
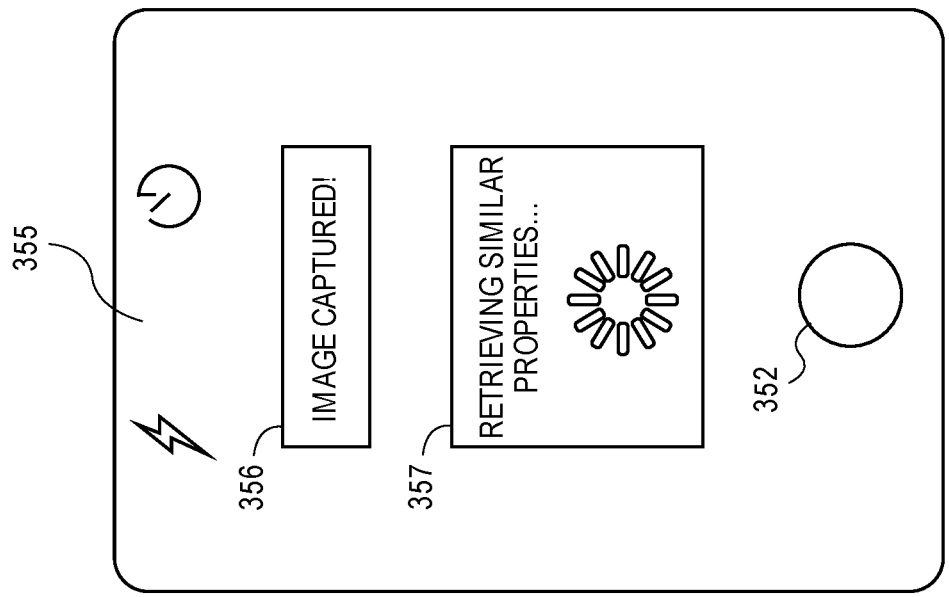
FIGS. 3A-3D depict exemplary user interfaces associated with identifying properties having the same architectural styles, in accordance with some embodiments.
Figure 3A:
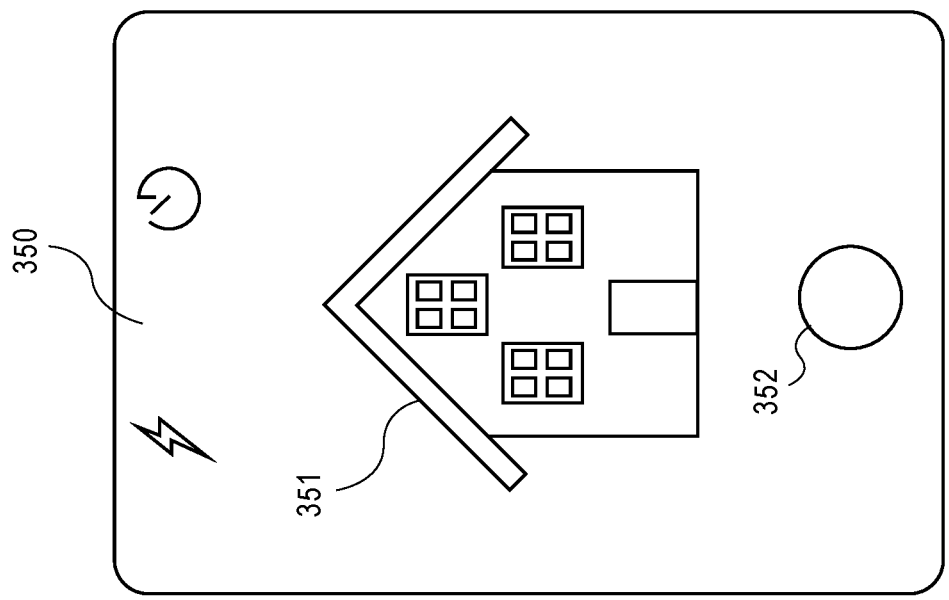

FIG. 3A illustrates an interface 350 depicting image data captured by an image sensor of the electronic device. In particular, the interface 350 includes a property 351 and a shutter selection 352. A user of the electronic device may select the shutter selection 352 to cause the electronic device to generate a digital image that depicts the property 351. Although FIG. 3A depicts a single instance of image capture, it should be appreciated that the electronic device may capture multiple images of the property 351.

FIG. 3B illustrates an interface 355 that the electronic device may display after a user selects the shutter selection 352 of FIG. 3A. The interface 355 may indicate (356) that the image was captured. Further, the interface 355 may indicate (357) that the electronic device is attempting to retrieve similar properties (i.e., properties having the same architectural style as the property 351). In an implementation, the electronic device may transmit any captured image data to a server and receive property information from the server. In another implementation, the electronic device may locally perform any image analyses and property identifications.

Figure 3D:
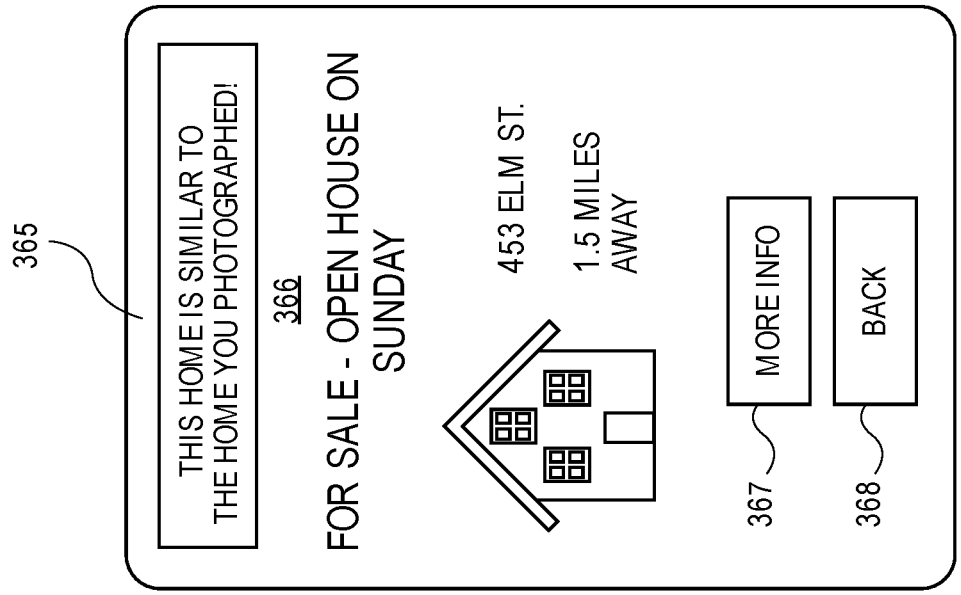
Figure 3C:
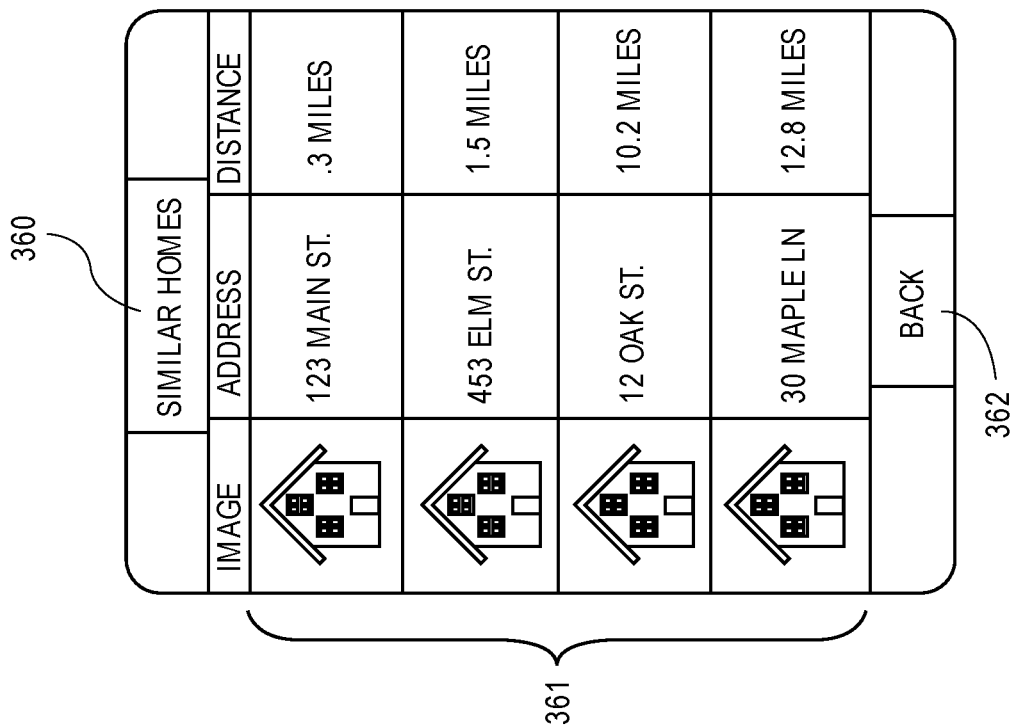

FIG. 3C illustrates an interface 360 that displays information associated with additional properties 361 having the same architectural style as the property 351. In particular, the information associated with the additional properties 361 may include an image, an address, and a distance from the property 351. The interface 360 may include a back selection 362 that, when selected, may cause the electronic device to return to a previous interface. Further, the interface 360 may enable the user to select one of the additional properties 361.

FIG. 3D illustrates an interface 365 that displays information 366 associated with a selected one of the additional properties 361. As illustrated in FIG. 3D, the information 366 indicates that the selected property is for sale and that there is an open house scheduled for Sunday. The information 366 further indicates an address as well as a distance from the originally-imaged property 351. The interface 365 may further include a more info selection 367 that, when selected, causes the electronic device to access and display additional information associated with the property. Further, the interface 365 may include a back selection 368 that, when selected, may cause the electronic device to return to a previous interface.

Figure 4A:
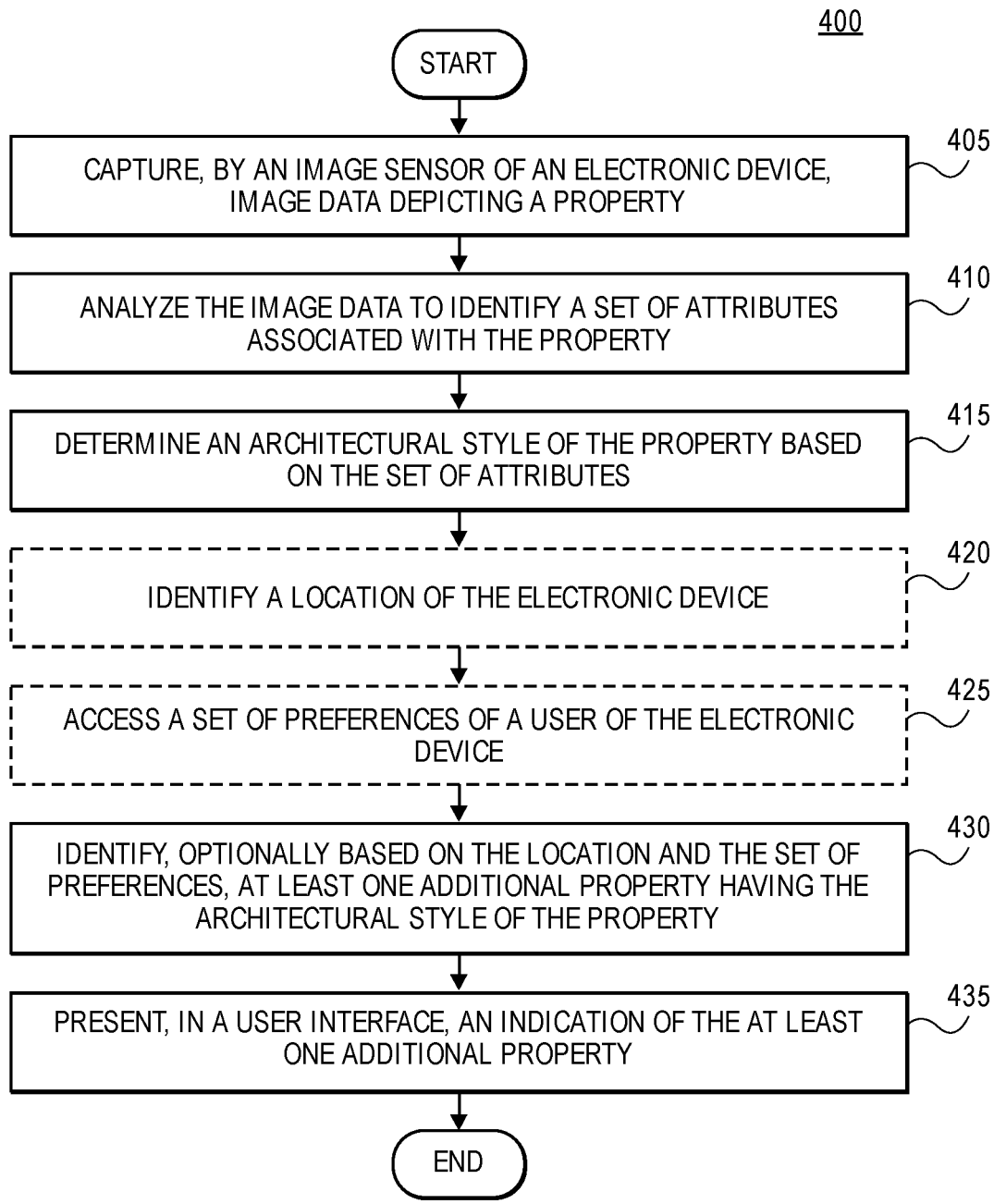
FIG. 4A is a flow diagram associated with analyzing image data to identify similar properties, in accordance with some embodiments.

FIG. 4A depicts a block diagram of an exemplary method 400 of analyzing image data to identify similar properties. The method 400 may be facilitated by an electronic device of a user (such as the electronic device 105) that may communicate with one or more servers via a wireless network connection. In particular, the electronic device may request or retrieve data from the one or more servers that the electronic device may use to facilitate the method 400.

The method 400 may begin with an image sensor of the electronic device capturing (405) image data depicting a property. In embodiments, the image data may be in the form of one or more digital images, where the digital images may depict any portion(s) of an exterior and/or interior of the property. Further, in embodiments, a user interface of the electronic device may display the captured image data, which may be in the form of a "live view" for the user to assess.

The electronic device may analyze (block 410) the image data to identify a set of attributes associated with the property. In embodiments, the set of attributes may include any combination of a set of window characteristics, a set of roof characteristics, a dormer presence, an amount of floors, a general shape of the property, a column presence, a turret presence, a balcony presence, a property building material, and/or others.

The electronic device may determine (block 415) an architectural style of the property based on the set of attributes. In embodiments, the electronic device may determine the architectural style based on calculating a similarity metric or score of the property relative to standard or baseline scores associated with known architectural styles. Further, in embodiments, the electronic device may determine the architectural style while the user interface of the electronic device displays the captured image data, and may display, in the user interface, an indication of the determined architectural style.

The electronic device may optionally identify (block 420) a location of the electronic device. In particular, the electronic device may identify the location using a location module (e.g., a GPS module). The electronic device may also optionally access (block 425) a set of preferences of the user of the electronic device. In embodiments, the set of preferences may include various filters associated with properties such as price, number of bedrooms, number of bathrooms, square footage, open house information, distance to schools, property type (e.g., house, condo, townhouse), HOA fees, year built, lot size, garage information, parking information, days for sale, recent price changes, and/or other filters.

The electronic device may identify (block 430) at least one additional property having the architectural style of the property. In some implementations, the electronic device may identify the at least one additional property as located within a specified distance of the location of the electronic device, and/or based on the set of preferences of the user. In other implementations, that electronic device may intelligently and automatically identify the at least one additional property based on certain stored data that may be separate from the location of the electronic device and the set of preferences of the user. In either implementation, the at least one additional property may have a respective at least one stored or set architectural style.

The electronic device may present (block 435), in the user interface, an indication of the at least one additional property. In this regard, the user may view the indication of the at least one additional property, make various selections, view additional information associated with the additional property, and/or facilitate other actions.

Figure 4B:
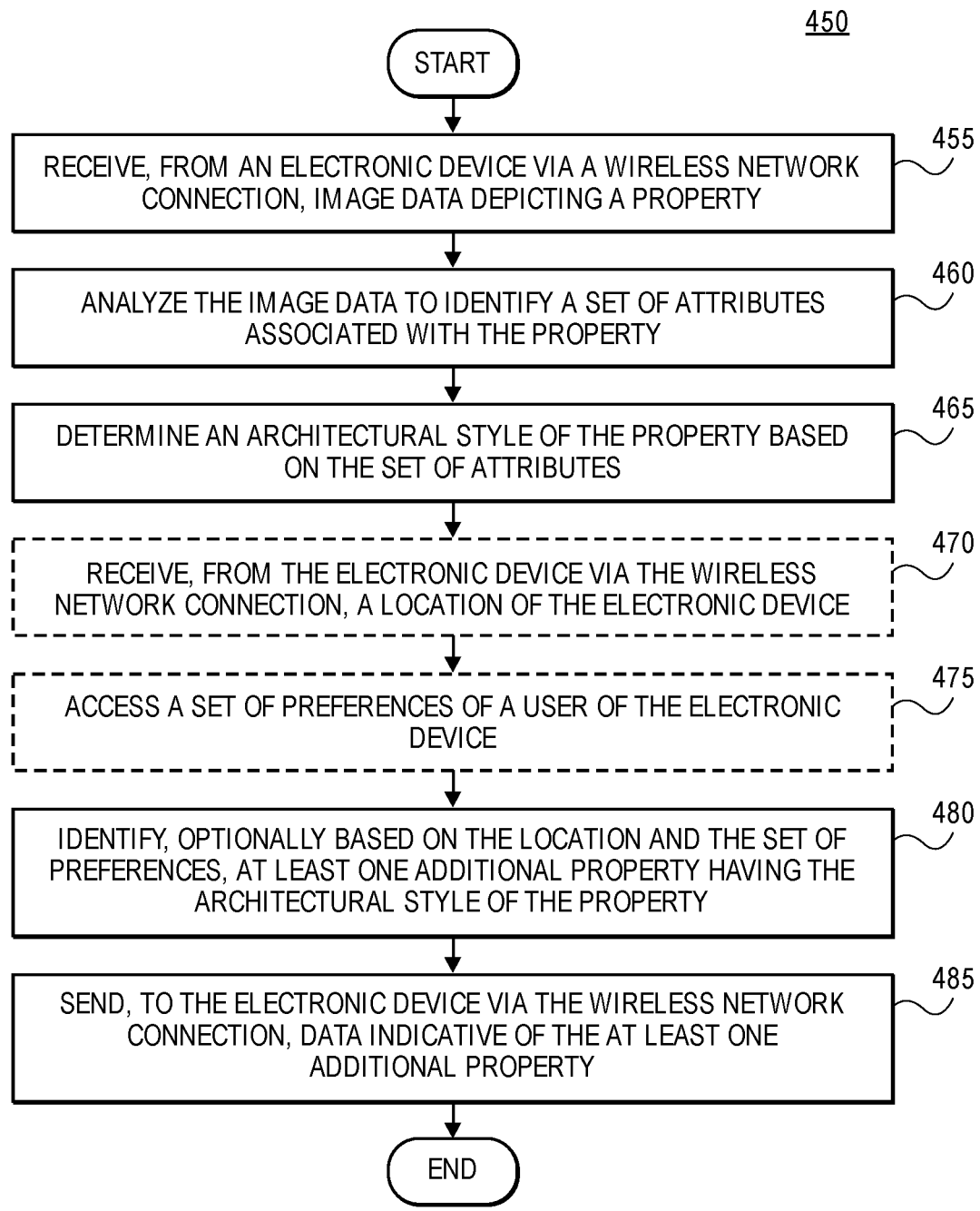
FIG. 4B is another flow diagram associated with analyzing image data to identify similar properties, in accordance with some embodiments.

FIG. 4B depicts a block diagram of an exemplary method 450 of analyzing image data to identify similar properties. The method 450 may be facilitated by a server (such as the server 110) that may communicate with an electronic device via a wireless network connection. In particular, the server may request or retrieve data from the electronic device that the server may use to facilitate the method 450.

The method 450 may begin with the server receiving (block 455), from the electronic device via the wireless network connection, image data depicting a property. In embodiments, the image data may be in the form of one or more digital images, where the digital images may depict any portion(s) of an exterior and/or interior of the property. Further, in embodiments, an image sensor of the electronic device may capture the image data, where a user interface of the electronic device may display the captured image data, which may be in the form of a "live view" for a user of the electronic device to assess.

The server may analyze (block 460) the image data to identify a set of attributes associated with the property. In embodiments, the set of attributes may include any combination of a set of window characteristics, a set of roof characteristics, a dormer presence, an amount of floors, a general shape of the property, a column presence, a turret presence, a balcony presence, a property building material, and/or others.

The server may determine (block 465) an architectural style of the property based on the set of attributes. In embodiments, the server may determine the architectural style based on calculating a similarity metric or score of the property relative to standard or baseline scores associated with known architectural styles. Further, in embodiments, the server may determine the architectural style while the user interface of the electronic device displays the captured image data, and may display, in the user interface, an indication of the determined architectural style.

The server may optionally receive (block 470), from the electronic device via the wireless network connection, a location of the electronic device. In particular, the electronic device may identify the location using a location module (e.g., a GPS module). The server may also optionally access (block 475) a set of preferences of the user of the electronic device. In embodiments, the set of preferences may include various filters associated with properties such as price, number of bedrooms, number of bathrooms, square footage, open house information, distance to schools, property type (e.g., house, condo, townhouse), HOA fees, year built, lot size, garage information, parking information, days for sale, recent price changes, and/or other filters. In embodiments, the server may receive the set of preferences from the electronic device via the wireless network connection.

The server may identify (block 480) at least one additional property having the architectural style of the property. In some implementations, the server may identify the at least one additional property as located within a specified distance of the location of the electronic device, and/or based on the set of preferences of the user. In other implementations, that server may intelligently and automatically identify the at least one additional property based on certain stored data that may be separate from the location of the electronic device and the set of preferences of the user. In either implementation, the at least one additional property may have a respective at least one stored or set architectural style.

The server may send (block 485), to the electronic device via the wireless network connection, data indicative of the at least one additional property. Accordingly, the electronic device may present, in the user interface, an indication of the at least one additional property. In this regard, the user may view the indication of the at least one additional property, make various selections, view additional information associated with the additional property, and/or facilitate other actions.

Figure 5:
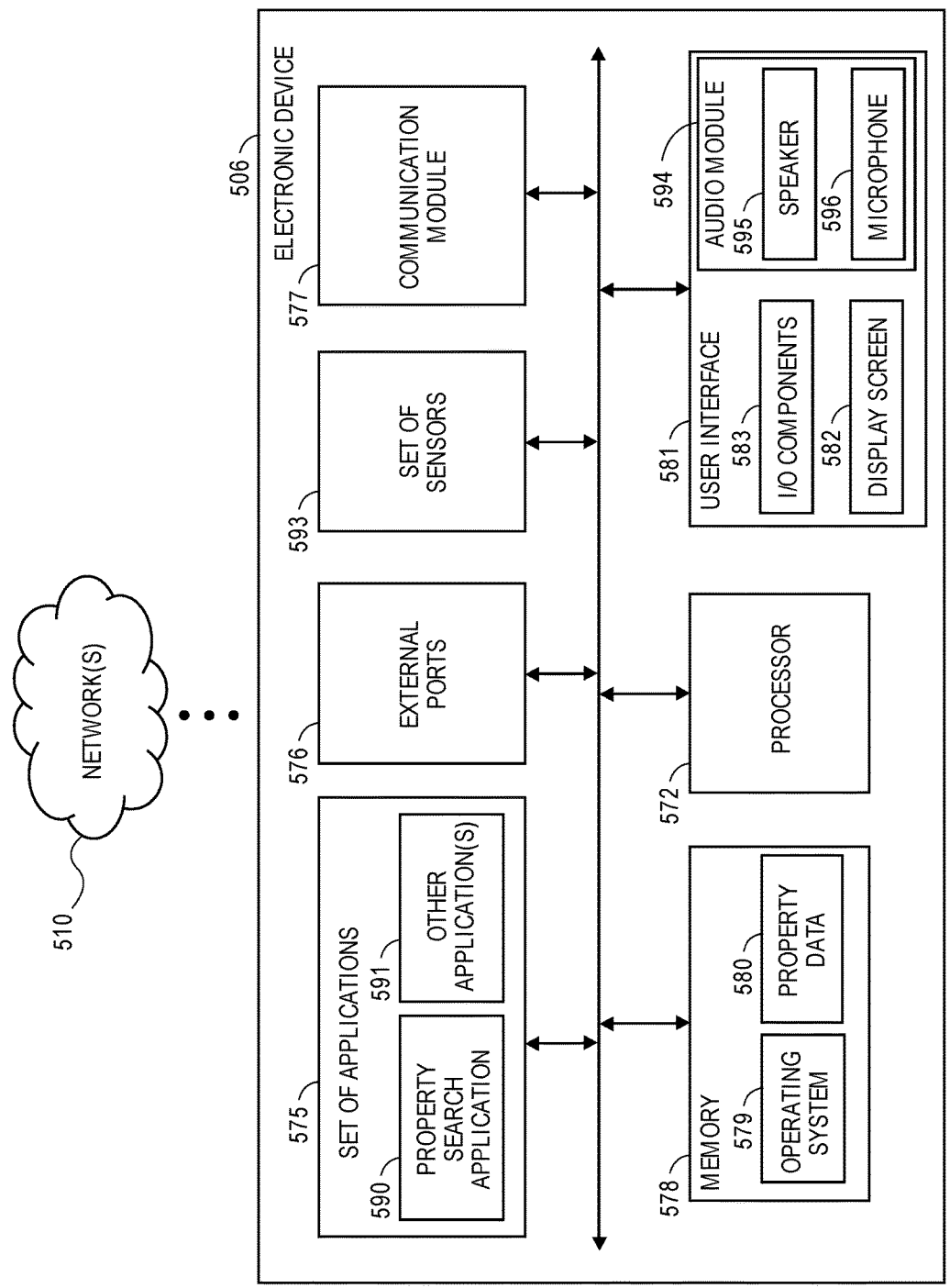
FIG. 5 is a block diagram of an exemplary electronic device, in accordance with some embodiments.

FIG. 5 illustrates a diagram of an exemplary electronic device 506 in which the functionalities as discussed herein may be implemented. It should be appreciated that the electronic device 506 may be configured to be connect to and communicate with various entities, components, and devices, as discussed herein. In one implementation, the electronic device 506 may be a portable device, such as the electronic device 105 as discussed with respect to FIG. 1. In another implementation, the electronic device 506 may be a server, such as the server 110 as discussed with respect to FIG. 1.

The electronic device 506 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an property search application 590 configured to determine architectural styles of properties and identify additional properties having the same architectural style. It should be appreciated that one or more other applications 591 are envisioned.

The processor 572 may interface with the memory 578 to execute the operating system 579 and the set of applications 575. According to some embodiments, the memory 578 may also store property data 580 that may indicate certain information associated with properties, such as the architectural style of the properties. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 506 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576.

The electronic device 506 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 506 via the user interface 581 to review information and/or perform other functions. The user interface 581 may also include an audio module 594 that may include a speaker 595 and a microphone 596. The electronic device 506 may further include a set of sensors 593 such as a location module, an image sensor, and/or other sensors.

In some embodiments, the electronic device 506 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of analyzing image data to identify similar properties, the method comprising:
   capturing, by an image sensor, image data depicting a property;
   analyzing, by a processor, the image data to identify a set of attributes of the property depicted in the image data;
   calculating, based on the set of attributes, (i) a first similarity metric corresponding to a first architectural style, and (ii) a second similarity metric corresponding to a second architectural style;
   determining that the first similarity metric is higher than the second similarity metric;
   deeming, based on determining that the first similarity metric is higher than the second similarity metric, that the property has the first architectural style;
   identifying at least one additional property having the first architectural style of the property depicted in the image data; and
   presenting, in a user interface, an indication of the at least one additional property.

2. The computer-implemented method of claim 1, wherein analyzing the image data to identify the set of attributes comprises:
   analyzing the image data to identify at least one of: a set of window characteristics, a set of roof characteristics, a set of doorway characteristics, a dormer presence, an amount of floors, a general shape of the property, a column presence, a turret presence, a balcony presence, and a property building material.

3. The computer-implemented method of claim 1, wherein identifying the at least one additional property having the first architectural style comprises:
   identifying, using a location module, a location of the electronic device; and
   identifying the at least one additional property having the first architectural style and located within a specified distance of the location of the electronic device.

4. The computer-implemented method of claim 1, wherein identifying the at least one additional property having the first architectural style comprises:
- accessing a set of preferences of a user of the electronic device; and
- identifying, based on the set of preferences, the at least one additional property having the first architectural style.

5. The computer-implemented method of claim 1, further comprising:
- in response to capturing the image data, displaying, in the user interface, at least a portion of the image data depicting the property;

and wherein analyzing the image data to identify the set of attributes comprises:
- analyzing the image data while at least the portion of the image data is displayed in the user interface.

6. The computer-implemented method of claim 1, wherein identifying the at least one additional property having the first architectural style comprises:
- sending, to a server via a wireless network connection, data indicative of the first architectural style; and
- receiving, from the server via the wireless network connection, data indicative of the at least one additional property having the first architectural style.

7. An electronic device configured to analyze image data to identify similar properties, comprising:
- an image sensor configured to capture image data;
- a user interface;
- a memory configured to store non-transitory computer executable instructions; and
- a processor configured to interface with the image sensor, the user interface, and the memory, wherein the processor is configured to execute the non-transitory computer executable instructions to cause the processor to:
  - access the image data from the image sensor, the image data depicting a property,
  - analyze the image data to identify a set of attributes of the property depicted in the image data,
  - calculate, based on the set of attributes, (i) a first similarity metric corresponding to a first architectural style, and (ii) a second similarity metric corresponding to a second architectural style,
  - determine that the first similarity metric is higher than the second similarity metric,
  - deem, based on determining that the first similarity metric is higher than the second similarity metric, that the property has the first architectural style,
  - identify at least one additional property having the first architectural style of the property depicted in the image data, and
  - cause the user interface to present an indication of the at least one additional property.

8. The electronic device of claim 7, wherein to analyze the image data to identify the set of attributes, the processor is configured to:
- analyze the image data to identify at least one of: a set of window characteristics, a set of roof characteristics, a set of doorway characteristics, a dormer presence, an amount of floors, a general shape of the property, a column presence, a turret presence, a balcony presence, and a property building material.

9. The electronic device of claim 7, further comprising:
- a location module;
- wherein to identify the at least one additional property having the first architectural style, the processor is configured to:
  - retrieve, from the location module, a location of the electronic device, and
  - identify the at least one additional property having the first architectural style and located within a specified distance of the location of the electronic device.

10. The electronic device of claim 7, wherein to identify the at least one additional property having the first architectural style, the processor is configured to:
- access a set of preferences of a user of the electronic device, and
- identify, based on the set of preferences, the at least one additional property having the first architectural style.

11. The electronic device of claim 7, wherein the processor is further configured to:
- in response to accessing the image data, cause the user interface to display at least a portion of the image data depicting the property, and wherein to analyze the image data to identify the set of attributes, the processor is configured to:
- analyze the image data while the user interface displays at least the portion of the image data.

12. The electronic device of claim 7, further comprising:
- a transceiver configured to communicate via a wireless network connection;
- wherein to identify the at least one additional property having the first architectural style, the processor is configured to:
  - send, to a server via the transceiver, data indicative of the first architectural style, and
  - receive, from the server via the transceiver, data indicative of the at least one additional property having the first architectural style.

13. A computer-implemented method of analyzing image data to identify similar properties, the method comprising:
- receiving, from an electronic device via a wireless network connection, image data depicting a property;
- analyzing, by a processor, the image data to identify a set of attributes of the property depicted in the image data;
- calculating, based on the set of attributes, (i) a first similarity metric corresponding to a first architectural style, and (ii) a second similarity metric corresponding to a second architectural style;
- determining that the first similarity metric is higher than the second similarity metric;
- deeming, based on determining that the first similarity metric is higher than the second similarity metric, that the property has the first architectural style;
- identifying at least one additional property having the first architectural style of the property depicted in the image data; and
- sending, to the electronic device via the wireless network connection, data indicative of the at least one additional property, wherein the electronic device presents an indication of the at least one additional property.

14. The computer-implemented method of claim 13, wherein analyzing the image data to identify the set of attributes comprises:
- analyzing the image data to identify at least one of: a set of window characteristics, a set of roof characteristics, a set of doorway characteristics, a dormer presence, an amount of floors, a general shape of the property, a column presence, a turret presence, a balcony presence, and a property building material.

15. The computer-implemented method of claim 13, wherein identifying the at least one additional property having the first architectural style comprises:

identifying the at least one additional property based on a presence of the set of attributes in the at least one additional property.

16. The computer-implemented method of claim 13, wherein identifying the at least one additional property having the first architectural style comprises:
- receiving, from the electronic device via the wireless network connection network, a location of the electronic device; and
- identifying the at least one additional property having the first architectural style and located within a specified distance of the location of the electronic device.

17. The computer-implemented method of claim 13, wherein identifying the at least one additional property having the first architectural style comprises:
- accessing a set of preferences of a user of the electronic device; and
- identifying, based on the set of preferences, the at least one additional property having the first architectural style.

* * * * *